United States Patent [19]

Leng et al.

[11] Patent Number: 4,638,372
[45] Date of Patent: Jan. 20, 1987

[54] COLOR COPIER

[75] Inventors: Svay Leng; Hiroyuki Saitoh; Toshiharu Inui; Norihiko Koizumi; Haruhiko Moriguchi; Takashi Omori; Masami Kurata; Yasuo Katoh, all of Ebina, Japan

[73] Assignee: Fuji Xerox Co., Ltd., Tokyo, Japan

[21] Appl. No.: 654,403

[22] Filed: Sep. 26, 1984

[30] Foreign Application Priority Data

Oct. 17, 1983 [JP] Japan ................. 58-192531

[51] Int. Cl.$^4$ ............ H04N 1/21; H04N 1/23; H04N 1/46
[52] U.S. Cl. ................................ 358/296; 358/75
[58] Field of Search ....................... 358/296, 75

[56] References Cited

U.S. PATENT DOCUMENTS 4,388,628  6/1983  Moriguchi et al. ............ 346/76 PH
4,521,805  6/1985  Ayata et al. ..................... 358/75

Primary Examiner—E. A. Goldberg
Assistant Examiner—Patrick W. Foster
Attorney, Agent, or Firm—Kinney & Lange

[57] ABSTRACT

A copier capable of producing both color images and monochrome images is disclosed, which comprises a platen for mounting thereon a manuscript, a scanner unit adapted to reciprocate relative to the platen and generate image signals divided in three primary colors by reading the manuscript for each line or for each set of a plurality of lines, four thermal heads for receiving image signals and, in response thereto, selectively actuating heat generation elements, means for supplying the thermal heads with ink donor films of four colors including black, and means for effecting thermal transfer printing on record paper.

11 Claims, 26 Drawing Figures (a) IMAGE SCANNING
(b) RED LIGHT
(c) GREEN LIGHT
(d) BLUE LIGHT
(e) PHOTOELECTRIC CONVERSION OUTPUT SIGNAL
(f) COLOR SEPARATION SIGNAL

COLOR COPIER

BACKGROUND OF THE INVENTION

1. Field of the Invention

This invention relates to a color copier which makes use of the transfer thermal printing technique.

2. Description of the Prior Art

Among the color copiers developed to data are included xerographic printers.

The color copiers of this type have entailed a disadvantage that they need maintenance because their corotrons are susceptible of defilement and their photoreceptors are prone to gather dirt. They have suffered from a further disadvantage that attendant treatments such as compilation of images are difficult because the whole process ranging from the reading of an image on a given manuscript to the reproduction of the image is optically performed. They have a salient drawback that their machines proper take up large spaces and their power consumption is heavy because their fixing units spend much electric power.

Some other conventional color copiers are constructed as illustrated in FIG. 1 and FIG. 2. In a color copier of this construction, a thermal recording head 301 and an opposite roll 303 are disposed as opposed to each other and an ink donor film 302 is passed between them.

The ink donor film 302 has yellow, cyan, and magenta ink layers 310, 320, 330 applied cyclically repeatedly in the order mentioned on a substrate of the ink donor film 302 as illustrated in FIG. 2 throughout the entire length of the film. The length l of each of the ink layers of different colors is equalized to the circumferential length of the aforementioned opposite roll 303. This ink donor film 302 is taken up on a winding roll 307. The speed at which the ink donor film 302 is taken up on the winding roll 307 is equalized to the peripheral speed of the opposite roll 303.

The opposite roll 303 is provided with a retainer clip 304 adapted to keep hold of a recording paper 306 wrapped on the circumferential surface of the opposite roll 303. In the proximity of the circumferential surface of the opposite roll 303, a combination strip finger and paper pass guide 305 is disposed.

The conventional color copier thus constructed is operated as follows. The recording paper 306 is passed through the combination strip finger and paper pass guide 305 and wrapped around the opposite roll 303. Then, the recording paper 306 is fastened to the circumferential surface of the opposite roll 303 with the retainer clip 304. Subsequently, the yellow portion 310 of the ink donor film 302 is brought into contact with the recording paper 306 wrapped around the circumferential surface of the opposite roll 303 and, during one complete rotation of the opposite roll 303, a yellow image is recorded on the recording paper 306 by means of the thermal recording head 301.

After that, the cyan portion 320 of the aforementioned ink donor film 302 is brought into contact with the aforementioned recording paper 306 and the aforementioned opposite roll 303 is completely rotated once again to have a cyan image recorded by virtue of the thermal recording head 301.

Then, the procedure described above is repeated to superimpose the magenta portion 330 on the recording paper 306.

When the ink donor film is formed by using the three colors of yellow, cyan, and magenta as described above, one round of color recording is completed by applying three cycles of image information to the thermal recording head 301 and causing the opposite roll 303 to make three complete rotations. As the recording is completed, the retainer clip 304 holding the recording paper 306 in place is released and the combination strip finger and paper pass guide 305 is actuated to peel the recording paper 306 from the opposite roll 303. Thus, the recording paper 306 is removed.

Since the conventional color copier described above requires the recording paper to be wrapped around the opposite roll and then fastened to the circumferential surface of the opposite roll by means of the retainer clip, it has a disadvantage that the opposite roll is intricate in mechanism and the operation of recording is complicated. It has another disadvantage that the copying is not performed quickly because completion of one copy of color record requires three complete rotations of the opposite roll. It has yet another disadvantage that since the ink donor film must be produced by cyclically repeating three ink layers of dissimilar colors each in a length exactly equaling the circumferential length of the opposite roll, the ink donor film is difficult to fabricate and, consequently, costs dearly.

SUMMARY OF THE INVENTION

An object of this invention is to provide a small inexpensive color copier which enjoys freedom from the aforementioned disadvantages suffered by the conventional countertype, requires only minimal maintenance, permits easy attendant treatments, and calls for no heavy power consumption.

Another object of this invention is to provide a color copier which possesses a simple mechanism, produces copies quickly, and operates effectively with an inexpensive ink donor sheet.

This invention features provision of a novel color copier which comprises a platen for mounting thereon a manuscript to be copied, a scanner unit adapted to reciprocate relative to the platen and generate image signals divided in three primary colors by reading the manuscript for each line or for each set of a plurality of lines, four thermal heads for receiving image signals and, in response thereto, selectively actuating heat generation elements, means for supplying the thermal heads with ink donor films of respective colors of black, yellow, cyan, and magenta, first transfer means for pressing a cut record paper into tight contact with the first thermal head through the medium of the ink donor film of the first recording part, a first peel means for peeling the record paper from the first ink donor sheet film on completion of transfer thermal printing by the first transfer means, similar sets of second, third, and fourth transfer means and peel means, and paper discharge means for discharging the record paper peeled by the first peel means or the fourth peel means.

DETAILED DESCRIPTION OF THE INVENTION

Now, the present invention will be described below with reference to a preferred embodiment.

Figure 3:
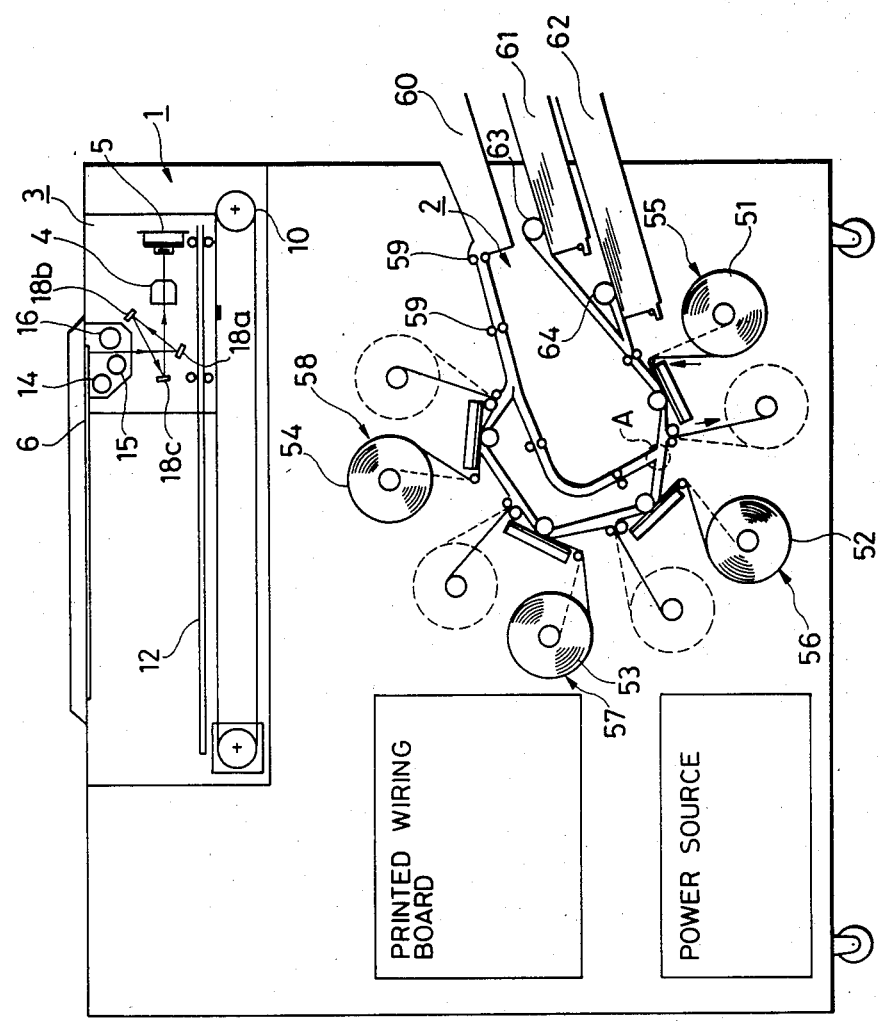
FIG. 3 is a schematic structural diagram of one embodiment of this invention.

FIG. 3 is a schematic structural diagram of a color copier as one embodiment of this invention. This copier is provided with an image scanning unit 1 for reading image information from a given manuscript and a color image recording unit 2 for producing a color print based on the image information.

The image scanning unit 1 is composed of a stationary platen 6 for mounting thereon the manuscript and a scanner unit 3 adapted to reciprocate on rails 12 parallelly attached to the platen 6. Inside the scanner unit 3, three fluorescent lamps 14, 15, and 16 of a length slightly greater than the width of the platen 6 are arranged at fixed intervals in a direction (main scanning direction) perpendicular to the direction of the movement of the scanner unit 3. Below the fluorescent lamps 14, 15, and 16 are disposed plane mirrors 18a, 18b, and 18c for guiding a reflected beam of light from the surface of the manuscript, an optical lens 4 for focusing the guided reflected light by the plane mirrors, and an image sensor 5 for converting the optical image into a corresponding electric signals. In the present embodiment, the image sensor 5 is capable of reading image information in R (red), G (green), and B (blue).

The scanner unit 3 is disposed so as to be freely reciprocated along the rails 12.

The color image recording unit 2 is provided with four feed rolls, i.e. a black feed roll 55 having rolled on a paper tube a black ink donor film 51 for effecting black printing, a Y color feed roll 56 having rolled on a paper tube a Y color ink donor film 52 for effecting yellow (Y) color printing, a M color feed roll 57 having rolled on a paper tube a M color ink donor film 53 for effecting magenta (M) color printing, and a C color feed roll 58 having rolled on a paper tube a C color ink donor film 54 for effecting cyan (C) color printing.

The recording part possesses four ink donor films of black, cyan, yellow, and magenta colors in the present embodiment, it may use only three ink donor films of cyan, yellow, and magenta colors when desired. In the use of these three colors, there arises a problem that the black printing effected by superimposition of the three colors of cyan, yellow, and magenta is not quite satisfactory in reproducibility of black color. There is another disadvantage that the reproduced image is blurred by poor color superimposition.

Now, the construction of the transfer part of the recording unit 2 will be described in detail below by citing the black transfer part for example. Evidently, the construction of any other color transfer part is identical or equal to that of the black transfer part.

Figure 4:
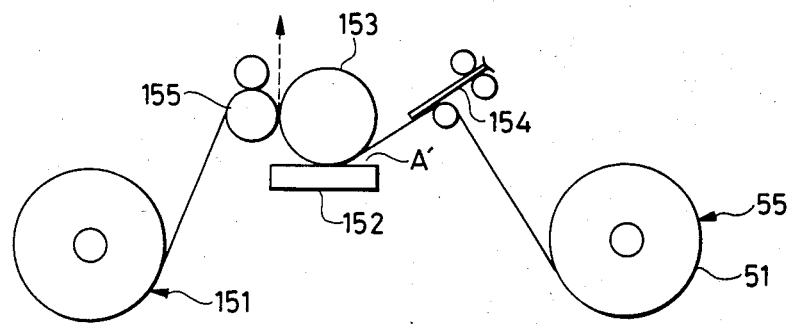
FIG. 4 is a detailed structural diagram of a transfer part.

FIG. 4 is a detailed structural diagram of the black transfer part.

This device is provided with a black feed roll 55 and a winding roll 151. The black feed roll 55 continuously feeds a strip of ink donor film 51 to the printing part A' and, after the film is used, the winding roll 151 recovers the film. The printing part A' comprises a thermal head 152 and a back roll 153. The back roll 153 presses both the ink donor film 51 and the record paper superposed thereon en route to the printing part A' against the thermal head 152.

The ink donor film 51 has a thermal melting ink or thermal subliming ink applied on one surface of a substrate. As the thermal head 152 is selectively actuated, the molten or sublimed ink is transferred onto the record paper to effect transfer thermal printing. The ink donor film 51 and the record paper 154 still continue following the rotation of the back roll 153 and move around the circumferential surface thereof. After they have passed the position at which the back roll 153 and the drive roll 155 are opposed to each other, they part from each other and the ink donor film 51 is rewound on the winding roll 151. The record paper 154 which has undergone transfer thermal printing is forwarded in the direction of the dotted line of FIG. 4.

In each of the printing parts, the conveyance of the record paper 154 is effected by virtue of the frictional force generated with the ink donor film. The conveyance of the ink donor film 51 is effected by driving a drive roll 155 with a stepping motor which is not shown in the diagram. Similarly, a stepping motor is used as a drive source for the scanner unit 3.

Now, the present embodiment will be described again with reference to FIG. 3.

The record paper is forwarded from either of the trays 61, 62 by a feed roller 63, 64 to the black printing part, there to be printed with black image information. Then, the record paper is forwarded to the yellow printing part, there to be printed with yellow image information. Subsequently, printing is repeated in magenta and cyan colors in the order mentioned. After the record paper has undergone printing in all the four colors, it is driven out into a discharge tray 60 by a discharge roller 59.

In this embodiment, the printing is made in the order of black, yellow, magenta, and cyan. Optionally this order may be changed to black, yellow, cyan, and magenta, or to black, cyan, yellow, and magenta, or to black, magenta, yellow, and cyan. In the drawing is shown a printed wiring board incorporating a signal processing circuit and circuits for the recording unit and a power source.

Figure 5:
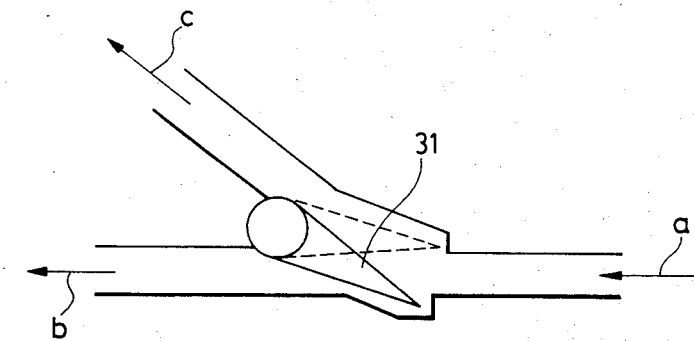
FIG. 5 is a detailed diagram of a switch sheet.

FIG. 5 is a detailed diagram of the part A enclosed with a dotted circle in the diagram of FIG. 3.

In the diagram, 31 denotes a switch sheet. This switch sheet 31 is used for selection between color printing and black (monochrome) printing.

For color printing, the switch sheet 31 is set at the position indicated by the dotted line. Then, the record paper which has been peeled from the black ink donor film and forwarded in the direction of the arrow a is caused by the switch sheet 31 to advance along the path not closed with the switch sheet 31 and delivered in the direction of the arrow b to the second color printing part (yellow printing part, for example).

For monochrome printing in black, the switch sheet 31 is turned and set to the position indicated by the solid line. In this case, therefore, the record paper peeled from the black ink donor film is caused by the switch sheet 31 to advance through the other path in the direction of the arrow c and forwarded to the discharge tray 60 without going through any other color printing part. By this setup, the material for the ink donor film and the printing time can be saved.

Figure 6:
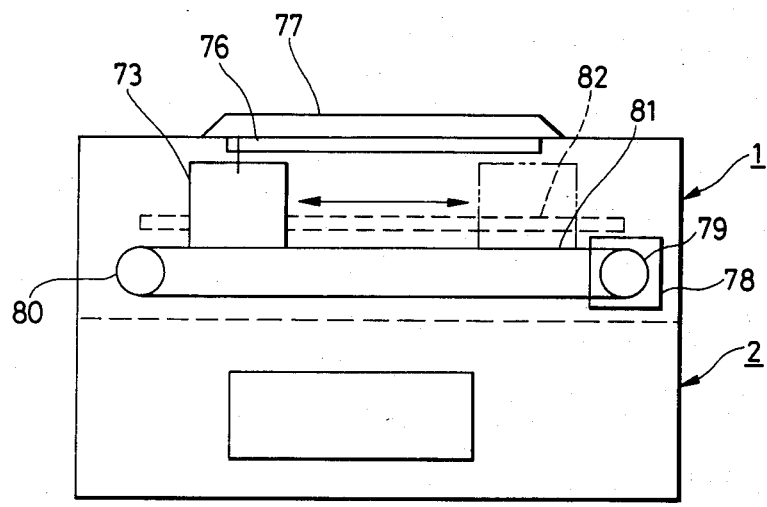
FIG. 6 is a schematic diagram of an image reader part.

Now, the construction and operation of the image scanning unit 1 will be described. FIG. 6 represents a schematic structural diagram of the image scanning unit 1. The image scanning unit 1 is mainly composed, as illustrated in FIG. 6, of the stationary platen 76 for mounting a given manuscript thereon and a scanner unit 73 adapted to reciprocate on the rails parallelly attached to the stationary platen 76.

The scanner unit 73 is secured to part of a timing belt 81 kept stretched with pulleys 79, 80 and is adapted to be freely reciprocated on the rails 82 by the rotation of a stepper motor 78 serving to rotate the pulley 79.

In the present embodiment, since the platen 76 is of a stationary type, the possibility of the manuscript being broken is remote as compared with the manuscript mounted on a movable platen. Although the platen is stationary and the scanner is movable in this embodiment, it is permissible to alter this arrangement to make the platen movable and the scanner stationary instead.

The sequence control part of the scanner energizes the motor drive circuit by a stated timing to set the motor 78 rotating in normal or reverse direction and reciprocate the scanner unit 73.

When only one copy of the manuscript is desired, the sequence control part controls the motor 78 in such a manner that the scanner unit 73, during the forward travel, will advance at a speed necessary for the reading of image and, during the backward travel, return to the home position (indicated by the solid line) at a speed higher than the speed necessary for the image reading.

When a multiplicity of copies of the manuscript are desired, the reading of image information is effected while the scanner unit 73 is in the forward travel and in the backward travel as well. Thus, the scanner unit is driven at an equal speed necessary for the image reading during the forward and backward travels. In this case, the image signal to be read out is reversed during the backward travel. Before this reversed image signal is forwarded to the printing part or the processing part, it must be converted to the normal image.

Figure 7:
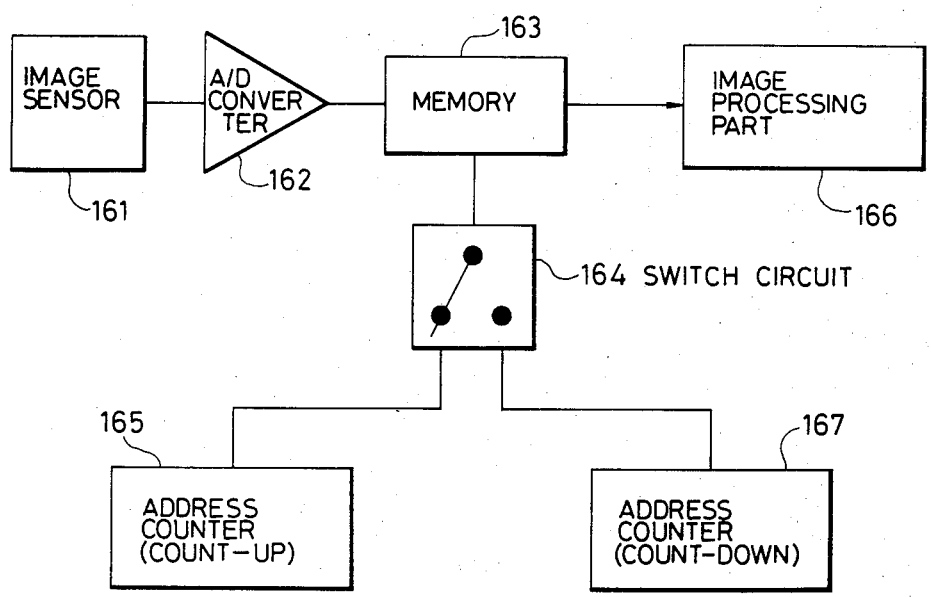
FIG. 7 is a block diagram of a device for converting information read out during reciprocation into a positive image.

The method used for this conversion is described below with reference to the block diagram of FIG. 7. The image information is read by the image sensor 161. One raster of image information read by the image sensor 161 is converted by an A/D converter 162 into digital signal and stored in a memory 163.

In the reading of image information during the forward travel of the scanner unit 73, a switch circuit 164 is set in the position indicated in the diagram to enable a count-up address counter 165 to effect the reading of image information. The image information read out of the memory 163 is forwarded to the image processing part or printing part 166.

In the reading of image information obtained during the backward travel of the scanning unit 73, the switch circuit 164 is turned and set to the position opposite that indicated in the diagram. The conversion of the image information read during the backward travel of the scanner unit is accomplished by counting down an address counter 167 by the unit of a line of the memory 163. A memory having a capacity of $4k \times 1$ bit is advantageously used as the memory 163. Some other memory such as the memory having a capacity of $1k \times 4$ bits may be used instead. In that case, the circuit must be slightly altered. This alteration is too obvious to any person of ordinary skill in the art to require any further explanation.

When a plurality of copies are desired to be obtained from one given manuscript, the practice of causing the scanner unit to read image information additionally during the backward travel offers an advantage that the time otherwise required for returning the scanner unit is omitted and the overall copying speed is increased.

Further in the scanner unit, the plurality of reflecting mirrors 18a–18c are used as illustrated in FIG. 3 for the purpose of reducing the size of the scanner unit 3 and the plurality of image sensors are used for the purpose of shortening the light paths. Although FIG. 3 illustrates just one image sensor 5, a plurality of image sensors are disposed in a direction perpendicular to the surface of the drawing paper.

A stepping motor serves advantageously as the drive motor 78 (FIG. 6) for the scanner unit 3. When this particular motor is adopted, the scanner unit 3 can be incrementally driven one raster at a time in the auxiliary scanning direction and can be easily synchronized with the operation of the printing part. The adoption of the stepping motor has another merit that the reading of image information can be started or stopped with ease by commands from an external device. In the present embodiment, a rotary type stepping motor is used. A linear stepping motor may be used instead.

The size of manuscript, the size of record paper, and the ratio of contraction or expansion of image can be set by the relevant switches mounted on a control panel. The range of scanner travel and the sequence of image reading are fixed as desired by such settings. Optionally, the copier may be enabled to effect automatic detection of the size of manuscript. One of the methods available for the automatic detection of the size of a given manuscript comprises using a platen cover tinted in black as a background and scanning the manuscript at a high speed just once before it is subjected to the reading of image information.

In the scanner unit, three fluorescent lamps red, green, and blue in color are used as light sources. In the present embodiment, the red fluorescent lamp which has long afterglow and poor light response is kept on throughout the entire reading time and the blue and green fluorescent lamps which have short afterglow and good light response are kept flashed.

FIGS. 8(a)-(e) shows the reading operation, with the horizontal axis as the scale of time. FIG. 8(a) depicts the fact that during one line of reading in the main scanning direction, the image sensor completes three rounds of scanning. FIGS. 8(b)-(d) depicts the fact that only the red fluorescent lamp is lit on during the first round, the red and green fluorescent lamps are lit on during the second round, and the red and blue fluorescent lamps are lit on during the third round, respectively of scanning. FIG. 8(e) depicts the photoelectric conversion output signals of red, red green, and red blue obtained after the delay of one scanning period.

Figure 8:
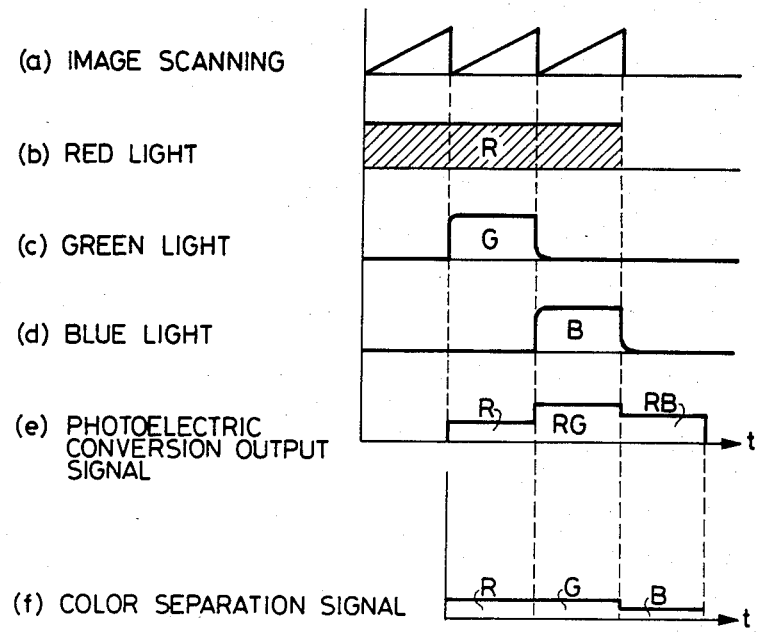
FIG. 8 is an explanatory diagram for illustrating the operation of reading of image on a manuscript.
Figure 9:
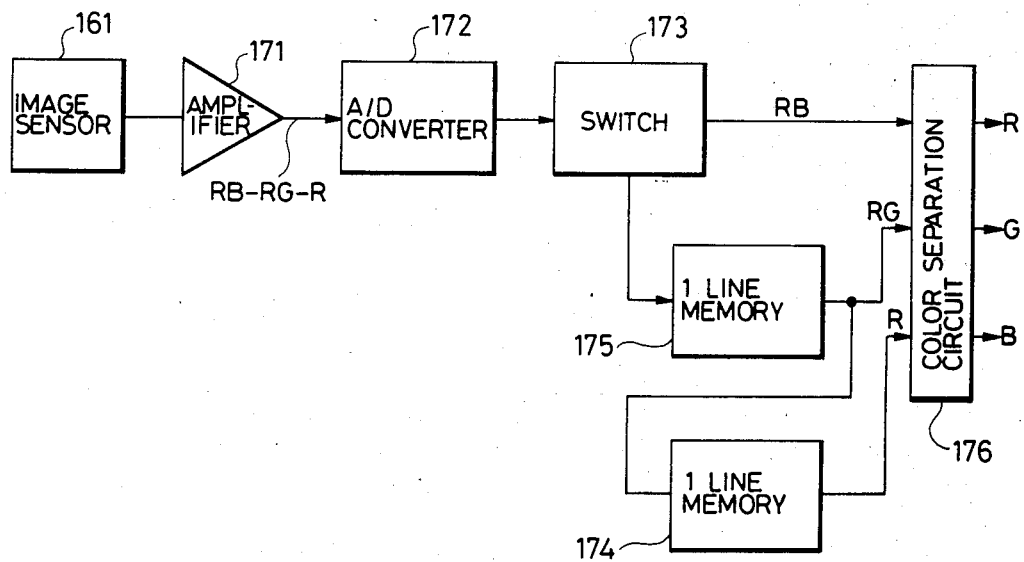
FIG. 9 is a block diagram of a signal processing circuit.

FIG. 9 is a block diagram of a signal processing circuit for obtaining the color separation signals of red, blue, and green indicated in FIG. 8(f) from the photoelectric conversion output signals shown in FIG. 8(e).

The image sensor 161 receives image information in the lights of red (R), red green (RG), and red blue (RB). The image sensor 161 converts the image information in such lights into corresponding electric signals. The electric signals are amplified by an amplifier 171 and fed into an A/D converter 172, there is to be converted into digital signals.

The digital signals thus produced in the A/D converter 172 are sorted by a switch 173 so that red signals are stored in a 1-line memory 174 and red-green signals in a 1-line memory 175. When the red-blue signals reach the switch 173, the switch 173 forward the red-blue signals to a color separation circuit 176. Synchronously with the red-blue signals, the red signals and the red-green signals are read out of the 1-line memories 174, 175 and fed to the aforementioned color separation circuit 176.

The color separation circuit 176 separates red, green, and blue signals from the red, red-green, and red-blue signals so received and feeds out the separated color signals. To be specific, the color separation circuit 176 performs the arithmetic operations of (red-green)—(red)=green and (red-blue)—(red)=blue and feeds out green and blue signals G, B and, at the same time, feeds out red signals R which has been fed in. A ROM serves advantageously as the color separation circuit 176. In this case, the red, green, and blue data stored in advance within the ROM have to be read out by using the aforementioned three inputs, namely red, red-green, and red-blue signals as the addresses.

FIG. 8(f) represents a color separation signal as an output from the color separation circuit 176.

FIG. 8 represents only the reading operation in one line for the sake of convenience. Evidently, this operation in fact is continuously repeated.

The image information which is obtained when the image sensor (such as a charge coupled device; CCD) reads the manuscript as described above is subjected to A/D coversion. In this case, use of a four-bit A/D converter permits image reading in 16 levels of halftone. It is only plain that the reproducibility of manuscript increases in proportion as the number of levels is increased. However, the image signals obtained by reading are the R, G, and B image signals of additive mixture of color stimuli. Thus, they must be converted into cyan (C), magenta (M), and yellow (Y) of subtractive mixture of color stimuli. To improve the image quality, the printing is carried out by the black ink donor film so far as black color is concerned.

Even when the printing is carried out as described above, however, the printing in blue by the use of the M and C ink donor films, for example, produces a blue copy only with low brightness at a fixed power application if the printing is performed by the transfer thermal printing method. For faithful reproduction of component colors, therefore, the printing is carried out not by the color conversion conforming to the ordinary formula (1), $$\left.\begin{array}{l} R = Y + M \\ G = Y + C \\ B = M + C \end{array}\right\} \quad (1)$$

but by the alteration of either or both of the applied power and the number of print image elements.

Where $R=G=B=O$ is satisfied (namely in the case of a black image), the printing is performed with the black (Bk) ink donor film. In the case of R, G, and B, the color conversion is effected in accordance with the following formula (2).

$$\left.\begin{array}{l} R = k_1 Y + k_2 M \\ G = k_3 Y + k_4 C \\ B = k_5 Y + k_6 C \end{array}\right\} \quad - \quad (2)$$

wherein $k_i$ stands for applied power data or pixel number data.

The colors (Y, M, C, and Bk) are printed in separate printing parts and, therefore, cannot be printed all at once. The different sets of color image information, therefore, are committed to temporary storage in the memory and, after elapse of a stated interval (delay time), read out and forwarded to the printing parts, there to effect the printing.

Figure 10:
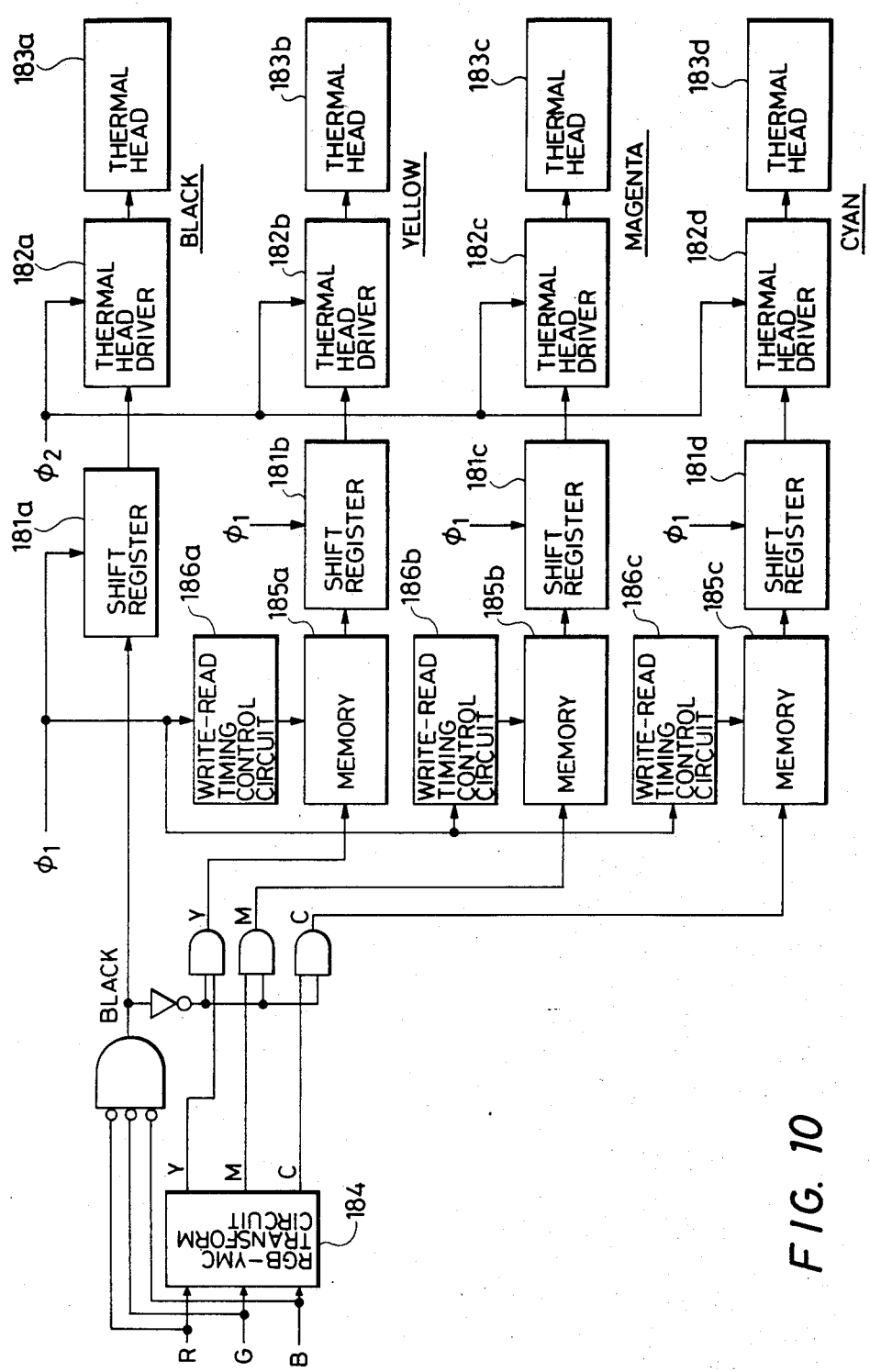
FIG. 10 is a block diagram of a recording part.

FIG. 10 represents a block diagram of printing parts adopting the method described above. Here, it is assumed that the printing colors used in the first through fourth printing parts are black, yellow, cyan, and magenta.

First regarding the black color, the black image information is directly forwarded to a shift register 181a without being stored in the memory and further delivered to the black printing part. In other words, it is forwarded to a black thermal head driver 182a and a thermal head 183a.

The image information converted to Y, M, and C in the RGB—YMC transform circuit 184 is transfered to the following circuits. The yellow image information is first stored in a memory 185a. It is not until the record paper reaches the yellow printing part that the yellow image information is read out of the memory 185a and the signals so read out of the memory 185a are forwarded to a shift register 181b. They are then advanced to the printing part composed of a thermal head driver 182b and a thermal head 183b, there to effect the printing. To permit the operation, therefore, the yellow image information memory 185a is required to have a capacity at least equivalent to the distance from the first printing part to the second printing part.

The procedure described above also applies to the image information in cyan and magenta. Denoted by 185b, 181c, 182c, and 183c are respectively the memory, shift register, thermal head driver, and thermal head for magenta.

Then, by 185c, 181d, 182d, and 183d are denoted respectively the memory, shift register, thermal head driver, and thermal head for cyan.

In the diagram $\phi_1$ and $\phi_2$ denote timing signals and 186a–186c denote write-read timing control circuits. It is naturally permissible to use page memories assigned to different colors in the place of the memories 185a–185c.

By the method described above, the image information can be faithfully read. Because the image information is faithfully read out, however, it does not necessarily follow that the image is faithfully reproduced. High printing property is indispensable to faithful reproduction of the image. One major obstacle to faithful reproduction of an image is the heat storage in the thermal head. The heat storage gains in influence in proportion as the speed of the printing increases.

Figure 11:
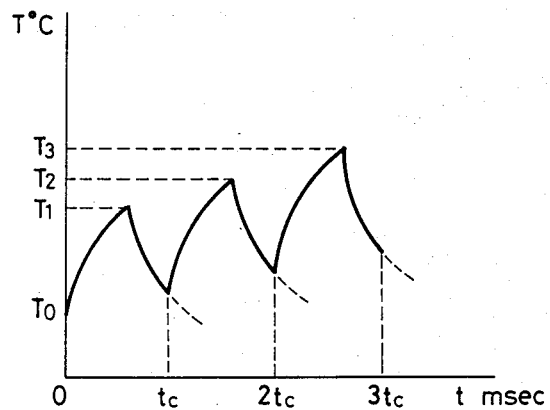
FIG. 11 is a graph showing the manner of heat storage.

FIG. 11 is a graph showing the manner of heat storage. It is now assumed that a certain heat generating element is at a temperature $T_0°C$. as illustrated in FIG. 11. When a pulse is applied on this heat generating element, the temperature is raised to $T_1°C$. and thereafter falls gradually. On elapse of an interval $t_c$, the same pulse applied to the heat generating element whose temperature has not returned to its original temperature $T_0°C$. causes the temperature of the heat generating element to rise to $T_2°C$. When the same pulse is again applied after elapse of an interval $t_c$, the temperature rises to $T_3°C$. $T_2°C$. is higher than $T_1°C$. and $T_3°C$. is higher than $T_2°C$. The effect of the heat storage increases in proportion as the cycle $t_c$ of printing shortens.

To expedite the cooling of the heat generating element, the present embodiment contemplates effecting forced cooling of the thermal head with a fan attached to the base of the thermal head, for example. If the forced cooling is not sufficient, the copier checks the condition of heat storage in the heat generating element, varies the magnitude of energy being applied in accordance with outcome of the check, and thus compensates for the heat stored in the heat generating element.

Figure 12:
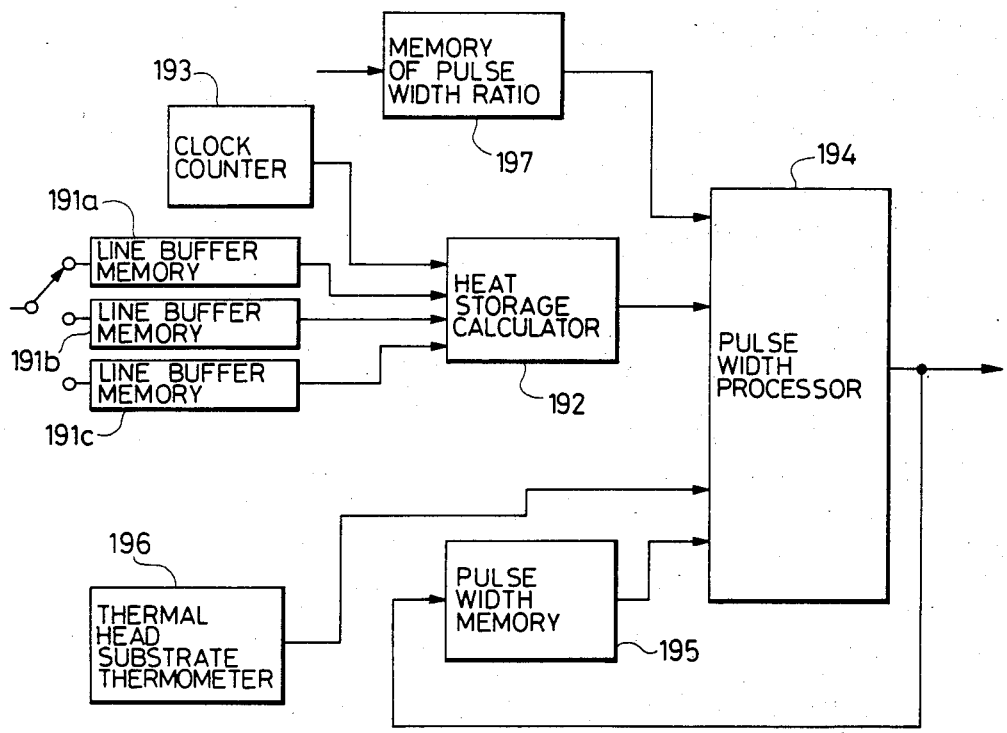
FIG. 12 is a block diagram of a heat storage compensation device.

FIG. 12 is a block diagram of a stored heat compensation device. The printed image signal information is stored in the line buffer memory. When the n'th line is desired to be printed, the sets of information in that line and the (n−1)'th and (n−2)'th lines are stored respectively in the line buffer memories 191a, 191b, and 191c. Then, these sets of line information are read out of the line buffer memories and fed in the heat storage calculator 192. To take into account the elapse of time from the last round of line printing, the heat storage calculator is provided with a clock counter 193 which clocks the time interval from the last line printing to the current line printing. The output from the clock counter 193 is also fed to the heat storage calculator 192.

The heat storage calculator 192, based on the information of the preceding data and the information on time, calculates to determine the condition of heat storage and feeds the outcome of the calculation to a pulse width processor 194.

The pulse width processor 194 determines the pulse width of the line about to be printed by using the output signal from the heat storage calculator 192, the output signal from the pulse width memory 195 keeping the pulse width of the preceding line in memory, the output information from the thermal head substrate thermometer 196, and the output signal from the memory of pulse width ratio 197. The output from the pulse width processor 194 is forwarded to the print control part on the next stage. For the pulse width thus determined to be used in the next line printing, it is again stored in the pulse width memory 195.

Figure 13:
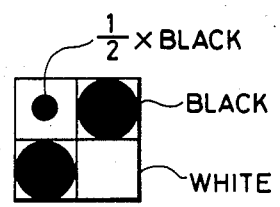
FIG. 13 is an explanatory diagram of the 3-level Dither Method.

The memory of pulse width ratio 197 begins to receive the image element information for the current printing. Here, the memory of pulse width ratio 197 is indispensable to the operation of halftone printing by the 3-level Dither Method. When the halftone printing is carried out by the 2×2 matrix 3-level Dither Method, for example, the pulse width is selected so that one image element is represented by a 2×2 dot matrix and each of the dots causes printing on one of the three levels (namely, white, black, and intermediate thereof) as illustrated in FIG. 13. By suitably combining three types of dot size and arranging them in 2×2 matrixes, desired halftone printing can be obtained.

Figure 14:
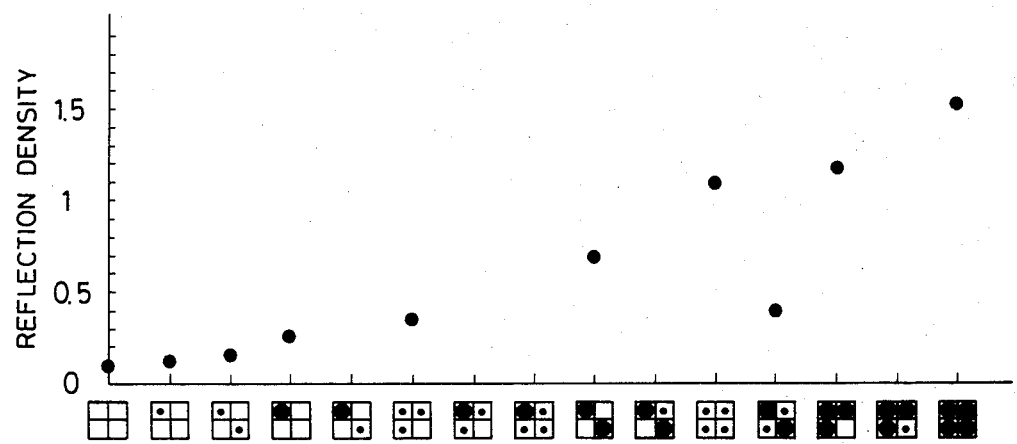
FIG. 14 is a diagram for illustrating the relation between the halftone printing and the reflection density.

FIG. 14 shows the relation between the combinations and the reflection density.

Faithful reproduction of a given manuscript, therefore, can be attained by carrying out the compensation of heat storage and the halftone printing as described above in each of the printing parts.

Here, main parts in the block diagram of FIG. 12 are described in detail in the specification of U.S. application Ser. No. 569,705 filed on Jan. 10, 1984 by this assignee.

Figure 1:
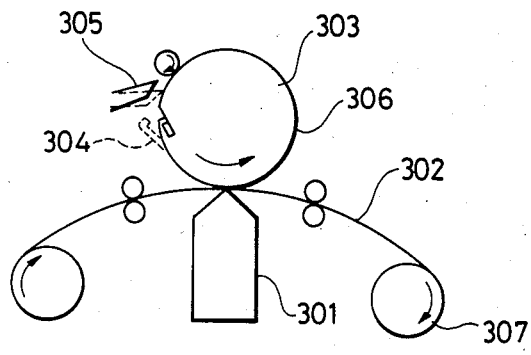
FIG. 1 is a schematic structural diagram of the essential part of the conventional color copier.
Figure 2:
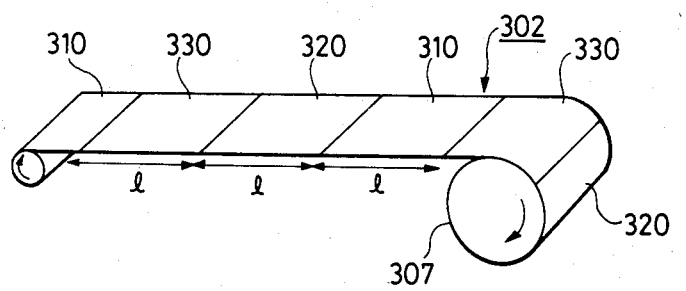
FIG. 2 is a perspective view of an ink donor film to be used in the color copier of FIG. 1.

Then, the ink donor films of different colors are conveyed by the respective drive rolls as already described with reference to FIG. 3. The feed volume of the ink donor film depends on the diameter, surface condition, and load condition of the relevant drive roll. The conveyance of the record paper is effected, as already explained with reference to FIG. 2, by the frictional force generated against the ink donor film in the gap between the back roll 153 and the thermal head 152.

For the speed of conveyance of the record paper to be uniformized, it becomes necessary to monitor the feed volume of the ink donor film in the relevant printing part and control it so as to be uniformized or equalized.

Incidentally, the drive roll 155 conveys the ink donor film 51 and, therefore, is caused to slip under the load exerted by the ink donor film or the load exerted because of the printing operation. When the control is effected by the method for causing the drive roll 155 to be rotated at a fixed rate, there are times when the feed volume of the ink donor film and that of the record paper fail to conform to each other correct superposition of color images fail. The back roll 153 is rotated by the movement of the record paper and, therefore, is exposed to only a nominal load. Thus there occurs very little slippage between the record paper and the back roll. By detecting the angle of rotation of the back roll, therefore, the amount of movement of the record paper can be determined.

Now, the feed control device which serves to uniformize the amount of movement of the record paper will be described. To the shaft of the back roll 153 is attached a disk having a plurality of slender through holes perforated therein as radially arranged and regularly spaced circumferentially. A luminescent diode and a photo-transistor are opposed to each other across the disk. In this arrangement, the rotation of the disk results in generation of pulses and the detection of the angle of rotation of the back roll is effected by taking count of the pulses. When the angle of rotation is found, the amount of movement of the record paper is determined by calculation using the diameter of the back roll.

The motor for driving the drive roll 155 is operated by the microstep drive method. This method is based on a mechanism or principle which effects the feeding with a fine step 1/n (n denoting a positive integer) times the standard feed volume.

Figure 15:
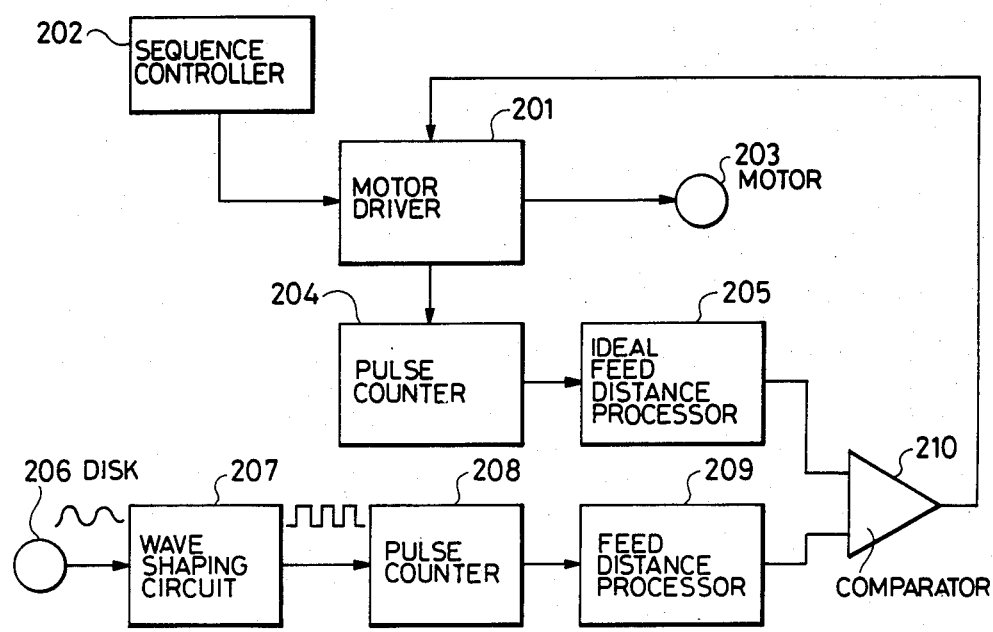
FIG. 15 is a block diagram of a feed controller.

The feed control circuit using a predetermined feed volume as the standard is depicted in a block diagram in FIG. 15. A motor driver 201 drives a motor 203 in accordance with the control signal issued from a sequence controller 202. When four pulses are generated from the sequence controller 202, for example, the motor 203 feeds the record paper by the distance of one raster in the direction of auxiliary scanning. The pulse counter 204 takes count of the number of pulses of the control signal issued from the sequence controller 202 through the motor driver 201. The number thus counted is forwarded to an ideal feed distance processor 205, there to be converted into an ideal feed distance. In the preceding case, the processor 205, on counting the four pulses, issues the ideal distance of one raster as its output. This processor 205 may be embodied by a ROM adapted to use the output from the pulse counter 204 as address and the ideal feed distance as source data, for example.

In the meantime, the pulse signal obtained by the rotation of the aforementioned disk 206 is shaped in a neat rectangular waveform by a wave shaping circuit 207 and the number of pulses of the signal is counted by a pulse counter 208. The number found by this counting by the pulse counter 208 is fed to a feed distance processor 209, there to be converted into the amount of movement of the record paper.

The outputs from the processors 205, 209 are forwarded to a comparator 210, there to be compared.

When the aforementioned ink donor film slips and fails to travel sufficiently in spite of the normal rotation of the drive roller 155, for example, the record paper is made to move by the same amount as the ink donor film and the back roll 153 to rotate by the corresponding angle. Consequently, the angle of rotation of the disk 206 is proportionately decreased and the value of the output from the processor 209 becomes smaller than that of the output from the processor 205.

The output from the comparator 210 is fed into the motor driver 201 and the motor driver 201 provides the motor 203 with a compensation proportionate to the value of output from the comparator 210. As the result, the amount of rotation of the motor 203 is compensated so as to approximate the feed distance of the record paper to the ideal feed amount.

In the embodiment described so far, the disk for detection of the angle of rotation is attached to the back roll. Optionally, it may be attached to an auxiliary roll instead. In addition of this disk, there may be used means capable of optically detecting the amount of movement of the record paper.

By the arrangement described above, printing of the image excellent in quality and free from poor color superimposition can be realized.

Now, the relation between the record paper and the ink donor film in various printing parts will be described.

Figure 16:
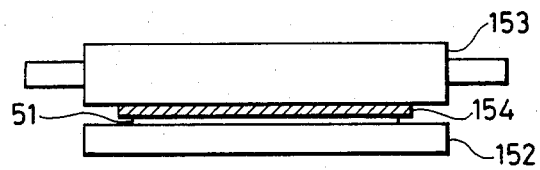
FIG. 16 is a side view showing the relation between a record paper and an ink donor film at the time of transfer.
Figure 17:
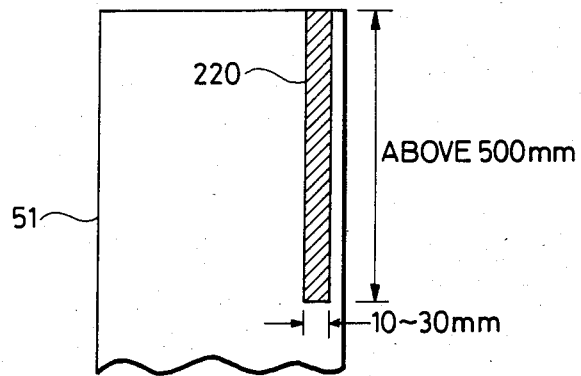
FIG. 17 is a plan view of the neighborhood of the trailing end of the ink donor film.

FIG. 16 illustrates the state in which the record paper 154 and the ink donor film 51 are superimposed between the back roll 153 and the thermal head 152. If the width of the ink donor film 51 is smaller than that of the record paper 154 as illustrated, each end face of the ink donor film 51 rubs the record paper 154 and leaves two continuous lines lightly inflicted on the record paper in the direction of length. In the present embodiment, therefore, the width of the ink donor film 51 is at least 2 mm larger than that of the record paper.

As explained previously, the transfer thermal printing involves the steps of melting the ink on the ink donor film by application of heat, transferring the molten ink in the shape of a given image onto the record paper, and peeling the record paper from the ink donor film. Unfortunately, this peeling generates electrostatic charge possibly amounting to ten-odd KV. This electrostatic charge can cause an erroneous operation in the electric circuit. The electrostatic charge thus generated by the peeling must be eliminated after the step of peeling.

The elimination of the electrostatic charge is effected by allowing a discharge brush to come into contact with the record paper and the ink donor film after the record paper has been peeled off the ink donor film. A grounded electroconductive brush serves advantageously as the discharge brush.

The negative image persists on the ink donor film after the record paper has been peeled off. This negative image must be erased for the prevention of possible leakage of confidential information. For this erasure, the heat roll is pressed against the ink donor film separated from the record paper. The surface temperature of the heat roll has only to be 10° to 30° C. higher than the melting point of the ink for the purpose of rendering the negative image undecipherable and precluding the possible leakage of confidential information. Optionally, a posistor or some other similar heater may be used in the place of the heat roll.

In the color printing, since the colors of cyan, magenta, and yellow are superimposed, the inks may be prevented from thoroughly permeating into the record paper. The fixation of the inks on the record paper, therefore, is attained by reheating the record paper after the step of transfer. This reheating is obtained advantageously by the use of radiant heat because the source of this heat has no possibility of being smeared with the ink transferred to the record paper.

The used portion of the ink donor film is rewound on a winding roll. In the present embodiment, since the movement of the ink donor film is utilized for the conveyance of the record paper, the conveyance of record paper is interrupted and the printer as a whole is thrown into jam when the ink donor film is completely rewound on the winding roll. To avoid the trouble, there must be provided means capable of detecting approach of the trailing end of the ink donor film to the winding roll. For this detection, a strip 220 of a width of about 10 to 30 mm is formed near the trailing end of the ink donor film 51 with an ink of color different from the color of the ink donor film 51. The length of this strip 220 is greater than the length of the record paper.

When the record paper is in the size of A3, for example, since the length of the paper is 420 mm, the strip is given a length of at least 500 mm.

The reason for this particular length of the strip is that even when the end of the ink donor film is detected while the printing is proceeding on one record paper, the printing just in process will be completed on this last recording paper. In this arrangement, when the information to be printed happens to be received from an external computer, the printing of the information on the record paper falling next to the trailing end of the ink donor film can be continued to the bottom limit of that record paper. There is no possibility of the printing being terminated halfway along the length of that record paper.

For the copier which has four printing parts, means capable of displaying the location of jam of record paper in any of the four printing parts proves highly convenient because it warrants ready elimination of the jam. As a sensor capable of discerning the presence of stagnant record paper in the paper path, a reflection type photosensor may be adopted. Optionally, the detection of such stagnation of record paper may be effected as by causing a microswitch to discern abnormality in the movement of a cantilever, for example.

Figure 18:
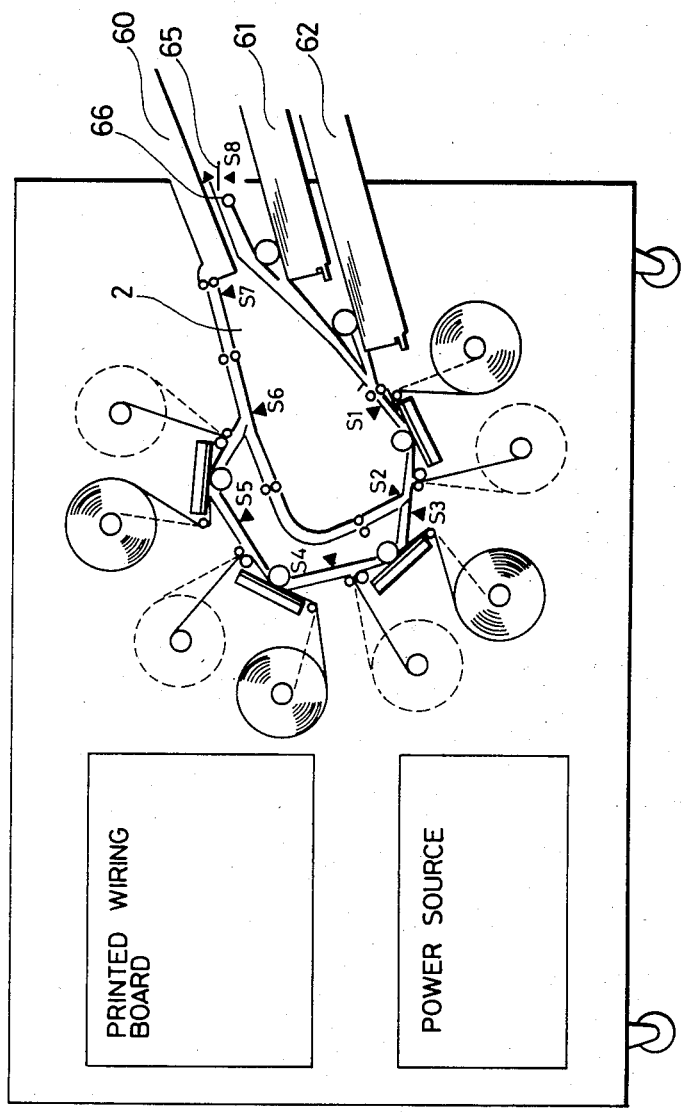
FIG. 18 is schematic diagram of the recording part for illustration of jam detection means.

FIG. 18 represents a schematic diagram of a printing part 2 for illustrating the jam detection means. As illustrated in the diagram, reflection type photosensors S1–S7 are disposed along the paper path. In the arrangement, the record paper is fed out of the tray 61 or 62, deposited fast on the ink donor film, and conveyed as carried thereon.

When the printing operation is started, the record paper is forced out of the tray 61 or 62, passed through the sensor S1, and conveyed to the first printing part. Then, it is successively advanced to the second to fourth printing parts and, in the meantime, passed along the sensors S2–S6. In this case, if the record paper is being normally forwarded at a fixed speed, each of the sensors is enabled to detect the leading end of the record paper by the time intervals corresponding to their distances of separation. Of course, they are capable of detecting the trailing end of the record paper along the advance of the record paper.

If the record paper is stuck or is prevented from being normally conveyed, the sensor falling next to the site of jam fails to detect the advance of the record paper, thus effecting detection of the jam. Further, safe conveyance of the record paper to the discharge tray 60 can also be detected by the sensor S7 located at the entrance to the discharge tray 60.

When there occurs jam of record paper, therefore, the device described above detects the location of the jam, displays this location on a display unit, and consequently enables the operator to proceed to elimination of the jam.

Now, a mechanism which permits ready removal of the record paper in jam will be described below. Generally, the record paper in jam cannot be readily removed because the pressure exerted by the thermal head and the back roll against each other is very high. Thus, there must be provided means for relieving the high pressure. One of means available for this purpose will be described below.

Figure 19:
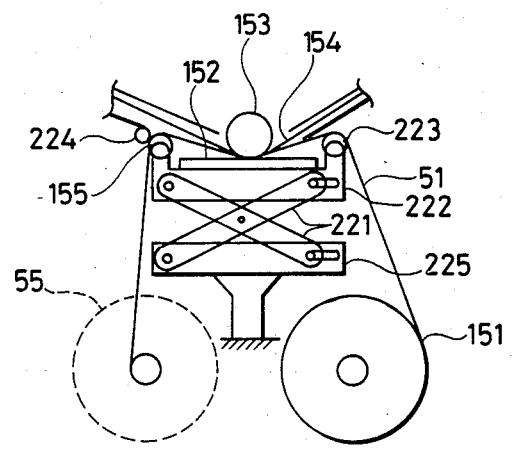
FIG. 19 is a structural diagram for showing the relation between a back roll and a thermal head in a state ready for transfer.

FIG. 19 represents a structural diagram illustrating the state in which the ink of the ink donor film 51 melted by the thermal head 152 is being transferred onto the record paper 154.

In the diagram, if the record paper 154 is jammed, it cannot be removed because it is pressed fast between the back roll 153 and the thermal head 152.

Figure 20:
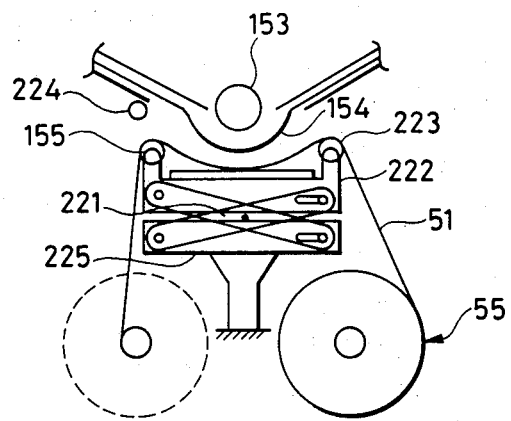
FIG. 20 is a structural diagram for showing the relation between the back roll and the thermal head in a state following elimination of jam.

FIG. 20 represents a structural diagram illustrating the state in which the record paper is removed from its jammed condition.

When the record paper is jammed, the head table 222 is lowered by the rotation of the slot lever 221. Consequently, the record paper 154 in a jammed condition is free to be taken out. In this manner, the record paper in the jammed condition can be easily removed.

In FIG. 19 and FIG. 20, 155 stands for a drive roll, 223 for a guide roll, 224 for a pinch roll, and 225 for a chassis. The same symbols as found in FIG. 4 denote identical components.

The conventional color copier has experienced a disadvantage that when the ink donor film runs out, the replacement of the used film with a fresh supply is difficult and takes much time and labor. In the color copier of this invention, this replacement can be simplified by using the ink donor film as contained in a cassette. The cassette used for this purpose and the mechanism for its attachment and detachment will be described below.

Figure 21:
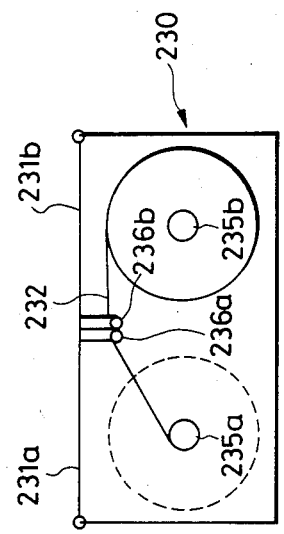
FIG. 21 is a plan view of a cassette exposed to view by removal of one side of a cassette case accommodating the ink donor film.
Figure 22:
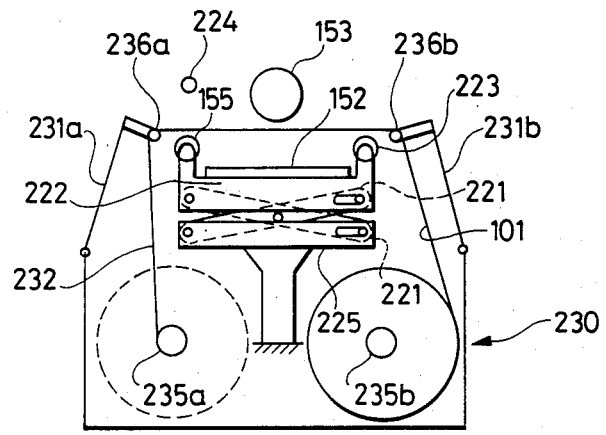
FIG. 22 and FIG. 23 are explanatory diagrams illustrating the operation involved in fitting the ink donor film into the recording part.
Figure 23:
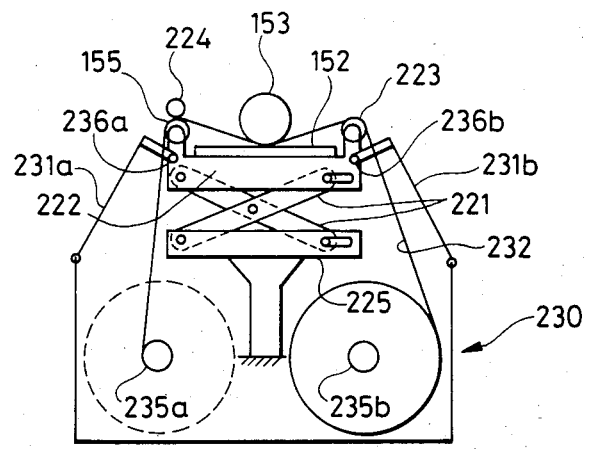

FIG. 21 is a plan view of a cassette as exposed by the removal of one side of a cassette case for accommodating an ink donor film. FIG. 22 and FIG. 23 are explanatory diagrams illustrating the procedure for mounting an ink donor film in the printing part.

In FIG. 21, an ink donor film 232 is wound on reels 235a, 235b and engaged with cassette rollers 236a, 236b formed at the opposed ends of doors 231a, 231b. The doors 231a, 231b are adapted to be opened on hinges fitted at the outermost ends.

To enable the cassette 230 accommodating therein the ink donor film 232 to be amounted in place on the device, the doors 231a, 231b of the cassette 230 are kept open away from each other as illustrated in FIG. 22. As the doors 231a, 231b are opened in the opposite directions, the ink donor film 232 is drawn out in conjunction with the cassette rollers 236a, 236b.

At this time, the thermal head 152 and the drive roll 155 inside the device are released respectively from the back roll 153 and the pinch roll 224. As the cassette 230 is inserted into the device, the head table 222 is raised and readied for thermosensitive printing by the Scott-Russel mechanism of the slot lever 221 as illustrated in FIG. 23.

To draw out the cassette 230, the head table 222 is lowered and the ink donor film 232 is opened by relying on the operation of the Scott-Russel mechanism of the slot lever 221.

By the procedure described above, the cassette 230 can be easily attached and detached.

In the copier of the present embodiment, two trays for keeping record papers are disposed in two stages. The number of trays are not limited to two. There may be incorporated more trays. Use of more trays entails an inevitable addition to the overall size of the copier. For normal use of the copier, two trays suffice.

There are times when use of a few sheets of record paper of a size not in popular use or use of sheets of irregular shape is inevitable. To permit use of such abnormal record paper without involving replacement of trays, the present embodiment incorporates a manual paper feeder (MPF) 65 (FIG. 18). When record papers are placed in the MPF as illustrated in FIG. 18, the sensor S8 detects the entry of these record papers. The sensor S8 consequently sets the MPF rollers 66 rotating to start feeding the manually inserted record papers preferentially to the first printing part.

Optionally, a button on the panel may be used for setting the MPF roller 66 into motion and consequently effecting required selection of the MPF 65 instead of relying upon the sensor S8 for detecting the entry of record papers and starting the rotation of the MPF roller 66.

Figure 24:
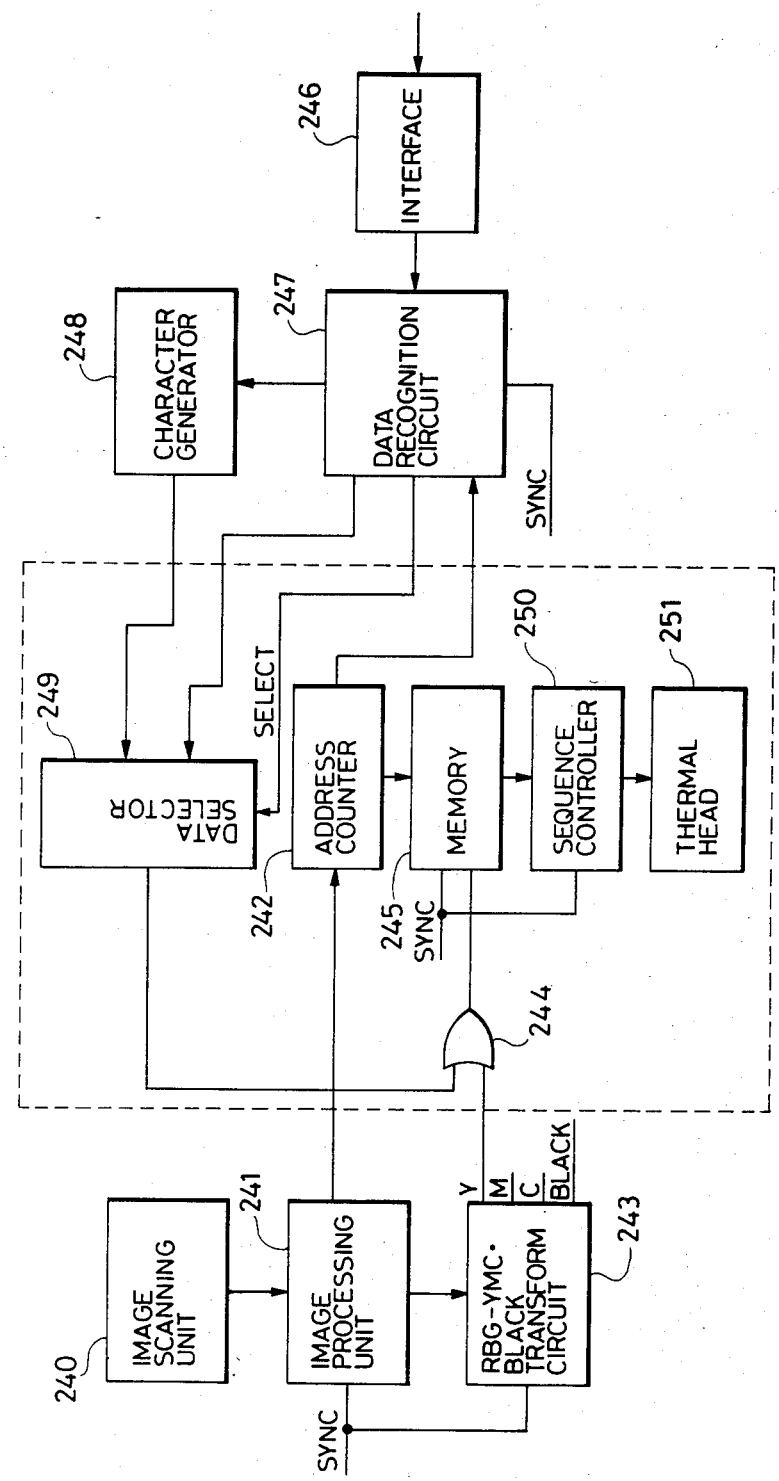
FIG. 24 is a block diagram of a device for synthesizing information from the manuscript and external information.

In the arrangement of the embodiment, the information of the manuscript is converted to digital signals, transfered and processed in order. It is, therefore, enabled to synthesize the information of the manuscript with external information. FIG. 24 represents a block diagram of a typical device for the synthesis of the information of the manuscript with external information. In the diagram, the circuit enclosed with dotted lines is a circuit for one color (yellow, Y, in this case). The diagram clearly implies that similar circuits are to be installed for other colors (M, C, and black). The circuit not enclosed with the dotted lines has no particular bearing upon colors and is shared in common.

The information of the manuscript is optically read by an image scanning unit 240, converted into electric signals, then subjected to A/D conversion, and forwarded to the image processing unit 241. The image processing unit 241 carries out color separation, forwards the information on position to the address counter 242 and, at the same time, forwards the information on RGB to the RBG—YMC black transform circuit 243. The details of this operation have been described with reference to FIG. 10.

The signals converted to the Y, M, C, and black information in the RGB—YMC black transform circuit 243 are forwarded through the synthesizing part 244 and stored in the memory 245. The address of the memory 245 is designated by the address counter 242.

In the meantime, the external information such as, for example, information brought in from a computer is injected into a data recognition circuit 247 via an interface 246. The data recognition circuit 247 examines the external information and discerns what type of information has been received and recognizes color information and information on position designation.

First depending on the information of color as included in the external information, the recognition circuit 247 determines what color data selector should receive the external information. If the external information happens to be color information concerning yellow, the recognition circuit 247 determines that the information received subsequently will be forwarded to the data selector 249. If the information happens to be color information concerning some other color, the recognition circuit 247 determines that the information to be received subsequently to the aforementioned color information will be forwarded to the data selector corresponding to the color in question.

If the external information happens to be information of a code type, an address is forwarded to a character generator 248 and actuates this character generator 248. If the external information happens to be information of a video type, this information is transferred to a data selector 249. The recognition circuit 247 receives signals from the address counter 242. Based on these signals and the external information on position designation, the aforementioned code type or video type information is fed out by a prescribed timing to the character generator 248 or the data selector 249 so that the external information will be synthesized with the information of the manuscript at a stated position.

The data selector 249, depending on the select signal brought in from the recognition circuit 247, makes selection between the output from the character generator 248 and that of the recognition circuit 247. The character information or the video information, whichever has been selected, is written in the memory via the synthesizing part 244. Thus, the synthesis of the information of the manuscript with the external information is effected.

The information which has been synthesized in the memory 245 is controlled in a sequence controller 250 and forwarded to a thermal head 251. The thermal head 251 is selectively heated in conformity with the information. The device of this portion has already been explained with reference to FIG. 10. It requires no further description.

The copier of the present embodiment enables the information of a given manuscript to be synthesized with an external information as described above and, therefore, finds utility in a wider range of applications. Besides the external information, internal staple information such as, for example, company name and brand names may be stored in a programmable read-only memory (PROM) and freely retrieved from the memory and synthesized with the information of a given manuscript by the use of the copier of this invention. Utility of this function enhances the economic value of the copier in the sense that the contents of a given manuscript can be overlaid with such internal information. Examples of the external system to which the copier of this invention can be interfaced include Centronix, RS232C, and GP-IB.

Figure 25:
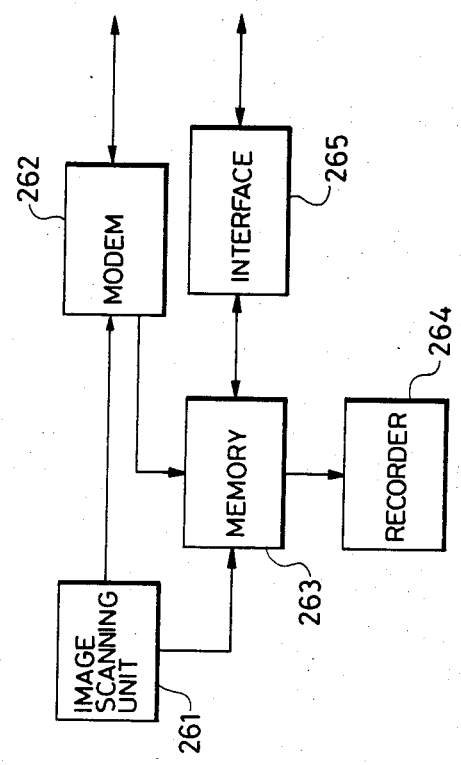
FIG. 25 is a block diagram illustrating the application of the embodiment of this invention to facsimile.

FIG. 25 represents a block diagram illustrating the present embodiment of this invention as modified to be usable as a facsimile. The information of a given manuscript read by an image scanning unit 261 is forwarded to a MODEM (modulator-demodulator) 262, there to be modulated and fed out. In the meantime, the signals received from an external source are demodulated by the MODEM 262 and committed to temporary storage in a memory 263. Then, the information is read out of the memory 263 and forwarded to the recorder 264 to be recorded. The copier of the present embodiment, when used as just described, functions as a facsimile.

The information of a manuscript read out by the image scanning unit 261 is forwarded to the memory 263 and further delivered to and recorded with the recorder 264. Operated by this procedure, the copier of this embodiment functions as an ordinary transfer type copier. Otherwise, the information from an external source such as a computer is introduced through an interface 265 and injected into the memory 263 and then synthesized therein with the information of a manuscript read in through the aforementioned image scanning unit 261. The copier, by this procedure, is enabled to effect printing of the information of the manuscript as synthesized with the external information.

Figure 26:
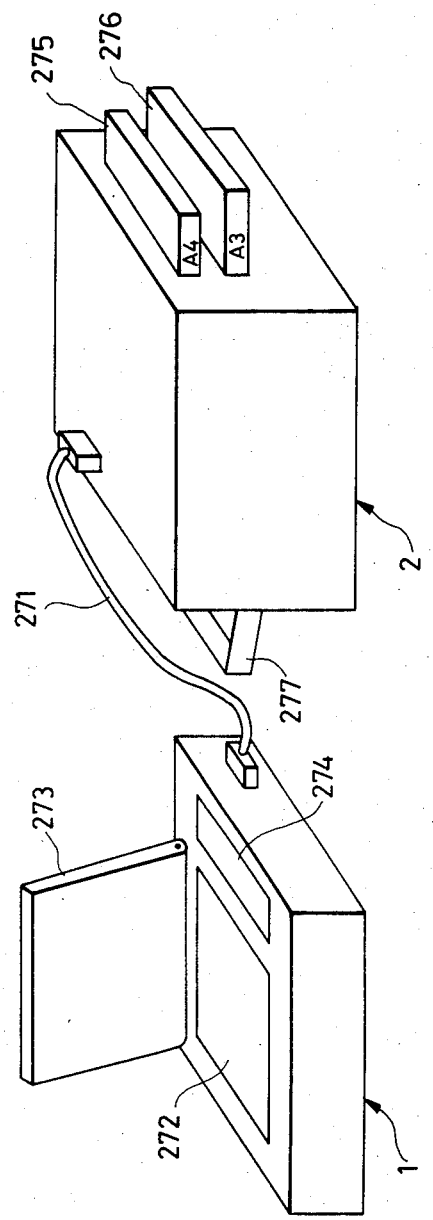
FIG. 26 is a perspective view illustrating the external appearance of housings separately accommodating the reading part and the printing part.

FIG. 26 represents a perspective view of the appearance of housing separately accommodating the image scanning unit 1 and the image recording unit 2.

The color copier illustrated in FIG. 3 has the image scanning unit 1 and the image recording unit 2 accommodated in one and the same housing. They may be separated and stowed separately in two different housings and connected to each other with a connection cable 271 as illustrated in FIG. 26.

In the diagram, 272 stands for a platen, 273 for a platen cover, and 274 for a panel. Then, 275 and 276 stand for paper trays and 277 for a discharge tray.

As described above, when the image scanning unit and the image recording unit are stowed in separate housings, they may be used severally for different purposes. For example, the image scanning unit 1 may be used as an input terminal for a computer and the image recording unit 2 as a printer. This construction has another advantage that they can be connected respectively to a printing part and a reader part in another system of its kind.

From this invention are derivable the following effects, for example:

(1) The color copier of this invention is an entirely new type of color copier which has no use for Corotron, photosensitive element, etc. Thus, it calls for substantially no maintenance.

(2) The color copier is constructed so as to effect desired printing by converting information optically read out of a given manuscript into electrical digital signals, storing such digital signals in a memory, and reading the information from the memory and printing the information through a thermal head onto a record paper. Thus, it permits compilation of image and synthesis of information with some external information with great ease.

(3) The color copier lacks a fixing device and other electric components which are prone to heavy power consumption. Thus, the copier as a whole enjoys low power consumption.

(4) No surface of the color copier is susceptible of defilement. Thus, the copier always provides clean copying. In this respect, it earns high esteem for reliability of performance.

(5) The copier permits size reduction to one half to one third of the size normal for the conventional countertype of comparable capacity.

(6) Since each of the printing parts is responsible for printing in one specific color, the copier as a whole produces copies quickly and permits adoption of inexpensive ink donor films.

(7) Since the record paper is not required to be wrapped around a roll as in the conventional copier, the copier of this invention enjoys simplicity of the paper feed mechanism.

What is claimed is:

1. A color copier, comprising a platen for mounting thereon a manuscript to be copied, a scanner unit adapted to reciprocate relative to said platen and generate image signals divided into three primary colors by reading said manuscript for each line or for each set of a plurality of lines, feed means for feeding cut recording sheets, a paper transfer route for transferring recording sheets fed out of said feed means, a first thermal head for feeding image signals in black disposed on said paper transfer route most closely to said feed means, second, third, and fourth thermal heads for feeding image signals in three colors other than black disposed sequentially on a downstream side relative to said first thermal head, paper transfer route switch means disposed in said paper transfer route between said first thermal head and said second thermal head, a by-pass paper transfer route formed between said paper transfer route switch means and a downstream side of said fourth thermal head, means for feeding ink donor sheets in black and in three colors other than black respectively to said thermal heads, first tightly pressing means for tightly pressing said recording sheet against said first thermal head through a medium of said ink donor sheet in black, first peel means for separating said recording paper from said ink donor sheet in black after completion of thermal transfer recording by said first thermal head, second, third, and fourth tightly pressing means and peel means similar to said first tightly pressing means and peel means, and paper discharge means for discharging said recording sheet separated by said first or fourth peel means, which color copier is characterized by the fact that for recording not in colors, said recording paper is separated by said first peel means and then guided by said paper transfer route switch means to said by-pass paper transfer route not passing said second, third and fourth thermal heads.

2. A color copier according to claim 1, wherein said black ink donor film is fed to said first recording part.

3. A color copier according to claim 1, wherein a width of a pulse applied to said thermal head is adjusted on a basis of a calculated condition of heat storage in said thermal head.

4. A color copier according to claim 1, which further comprises means capable of relieving pressure between said thermal heads and back rolls pressed by said tightly pressing means and thus enabling said thermal heads to be separated from said back rolls.

5. A color copier according to claim 1, wherein said peel means is adapted to fulfil an additional function of discharging electrostatic charge from at least either of said ink donor film and said record paper after their mutual separation.

6. A color copier according to claim 1, wherein said peel means is adapted to fulfil an additional function of applying heat on the entire surface of said ink donor film after separation.

7. A color copier according to claim 1, which further comprises means for overlying information of manuscript read by said scanner unit with information from another source.

8. A color copier according to claim 1, which further comprises means for automatically and manually feeding record paper.

9. A color copier according to claim 1, wherein three light sources of red, green, and blue colors are prepared for the scanning of a manuscript containing a color image, said red light source is kept on throughout the entire period of scanning, and the other color light sources are kept flickered at prescribed intervals.

10. A color copier according to claim 1, wherein said recording parts are adapted to enable halftone printing.

11. A color copier according to claim 1 wherein a magnitude of electric power applied to said thermal head is adjusted on a basis of a calculated condition of heat storage in said thermal head.

* * * * *